US006612668B2

(12) United States Patent
Doan

(10) Patent No.: US 6,612,668 B2
(45) Date of Patent: Sep. 2, 2003

(54) PORTABLE COMPUTER WITH ARTICULATE BASE

(75) Inventor: Hung Quoc Doan, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/939,429

(22) Filed: Aug. 24, 2001

(65) Prior Publication Data

US 2003/0038567 A1 Feb. 27, 2003

(51) Int. Cl.⁷ .............................. H05K 7/16; G06F 1/16
(52) U.S. Cl. ...................... 312/223.2; 361/683; 16/303
(58) Field of Search ....................... 312/223.2, 223.1; 361/683, 684, 685, 724, 725, 726, 727; 248/917, 918, 919, 920, 921, 922, 923; 16/303, 330, 339

(56) References Cited

U.S. PATENT DOCUMENTS

| 4,196,821 | A | * | 4/1980 | Teti et al. ..................... 16/330 |
| 4,859,092 | A | * | 8/1989 | Makita ..................... 312/223.3 |
| 5,107,401 | A | * | 4/1992 | Youn ........................... 361/683 |
| 5,168,427 | A | | 12/1992 | Clancy et al. |
| 5,251,102 | A | * | 10/1993 | Kimble ....................... 361/683 |
| 5,278,779 | A | | 1/1994 | Conway et al. |
| 5,293,300 | A | * | 3/1994 | Leung ......................... 361/683 |
| 5,490,036 | A | | 2/1996 | Lin et al. |
| 5,629,832 | A | | 5/1997 | Sellers |
| 5,642,258 | A | * | 6/1997 | Barrus et al. ................ 361/683 |
| 5,682,644 | A | * | 11/1997 | Bohacik et al. ................ 16/303 |
| 5,754,395 | A | | 5/1998 | Hsu et al. |
| 5,966,776 | A | * | 10/1999 | Ona ............................. 16/303 |
| 6,028,768 | A | | 2/2000 | Cipolla |
| 6,081,207 | A | | 6/2000 | Batio |
| 6,253,419 | B1 | * | 7/2001 | Lu ............................... 16/340 |
| 6,392,871 | B1 | * | 5/2002 | Yanase ........................ 361/683 |
| 6,392,877 | B1 | * | 5/2002 | Iredale ........................ 361/683 |
| 6,430,038 | B1 | * | 8/2002 | Helot et al. .................. 361/683 |
| 6,456,488 | B1 | * | 9/2002 | Foster et al. ................. 361/683 |

FOREIGN PATENT DOCUMENTS

| DE | 4345112 | * | 5/1994 | ................ 361/683 |
| WO | 9211623 | * | 7/1992 | ................ 361/683 |

* cited by examiner

Primary Examiner—Lanna Mai
Assistant Examiner—Hanh V. Tran
(74) Attorney, Agent, or Firm—Perkins Coie LLP

(57) ABSTRACT

An articulate base for a portable computer, a portable computer having such a base and a method of configuring a portable computer. In one embodiment, the base includes a front segment and a rear segment pivotable with respect to one another about a hinge to move the base from a flat configuration to an angled configuration. In the angled configuration, the hinge is elevated and the front and rear segments are both inclined upwardly toward the hinge. This allows a keyboard 80 carried by the upper face of the base to be presented to the user at an angle.

58 Claims, 4 Drawing Sheets

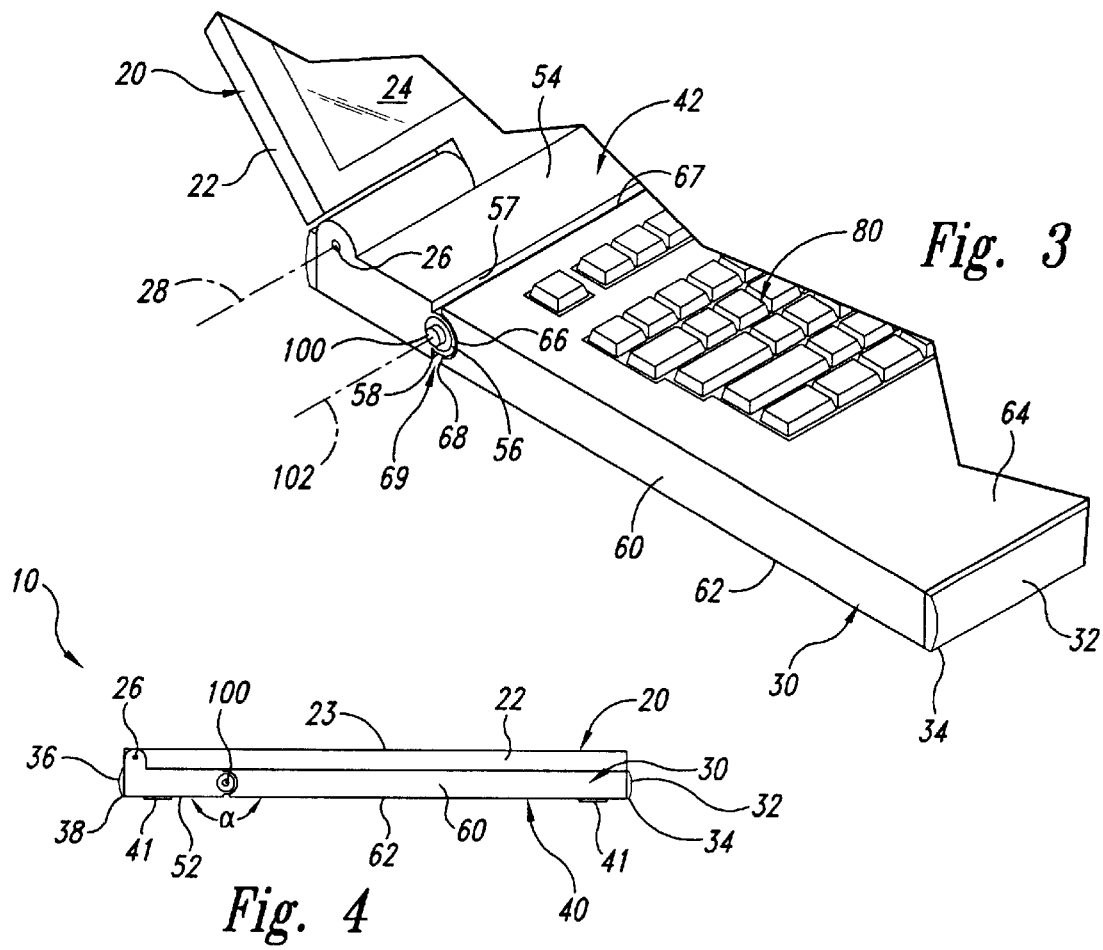
Fig. 3
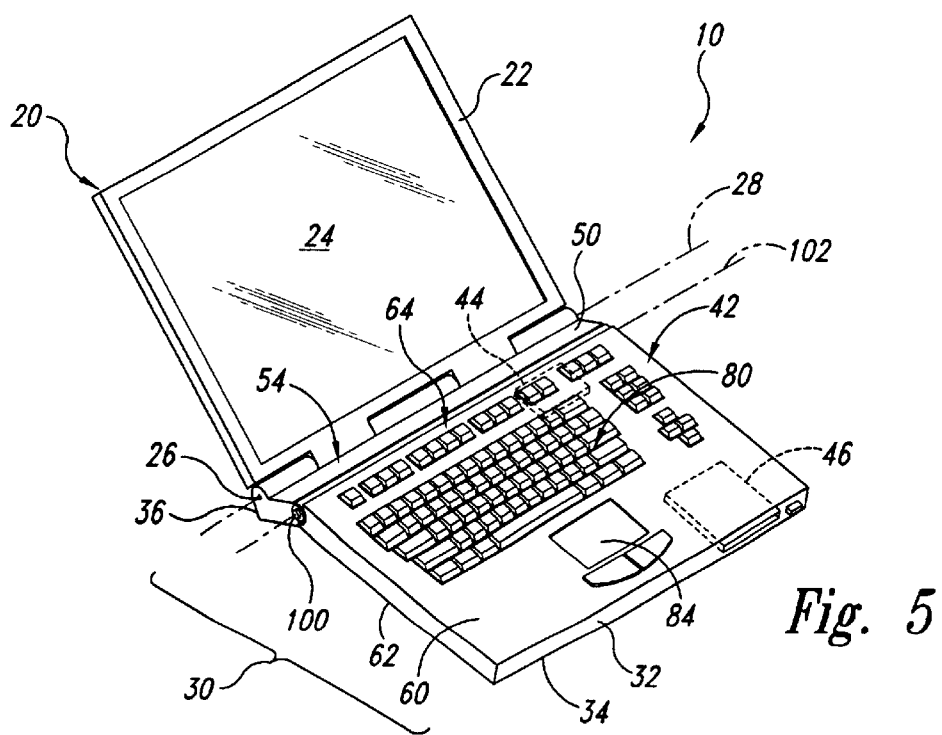
Fig. 4
Fig. 5

PORTABLE COMPUTER WITH ARTICULATE BASE

TECHNICAL FIELD

This invention relates generally to ergonomic improvements for portable computers such as notebook computers and laptop computers.

BACKGROUND

Keyboards for desktop computers are commonly provided with retractable legs to allow the user to selectively angle the keyboard during use. When the legs are retracted, the bottom of such a keyboard will be flat and will rest flush on a horizontal support surface such as a desk or a keyboard tray. With the legs in their extended position, though, the keyboard is tilted, with the front of the keyboard (i.e., the edge of the keyboard positioned closer to the user) being lower than the rear of the keyboard. Presenting the keyboard to the user at an angle in this fashion facilitates a more ergonomic hand and wrist orientations when the user types on the keyboard.

Most commercially available portable computers do not permit ergonomic adjustments of the keyboard. Typically, these portable computers have a display which is hingedly connected to a base which houses a processor. The keyboard is carried on an upper face of the base and its orientation with respect to the base remains fixed. In use, the bottom surface of the base will rest on a horizontal support surface. Because the orientation of the keyboard remains fixed with respect to the base, the user is not permitted to adjust the keyboard to a more ergonomic configuration.

To address this shortcoming, a number of people have suggested providing portable computers with small retractable legs similar to those provided on conventional keyboards. Conventional keyboards tend to be fairly lightweight and remain in place with the associated desktop computer. Retractable legs on a portable computer are subject to significantly greater stress than are the legs of a regular keyboard, though. The small retractable legs are required to support the entire weight of the portable computer, which is likely considerably greater than that of a conventional keyboard. In addition, the legs must be retracted every time the portable computer is stored for transport and deployed again for use. This places additional strain on small retractable legs.

Other people have proposed making the keyboard on a portable computer movable with respect to the base. For example, in U.S. Pat. No. 5,490,036, Lin et al. proposed a portable computer with a separate, self-contained keyboard structure that is attached to the rest of the base by a hinge. By pivoting the front of the keyboard about the hinge, the angle of the keyboard with respect to the rest of the base can be adjusted. This permits the base to remain in flush contact with the support surface and the hinge of the keyboard need only support the weight of the keyboard instead of supporting the weight of the entire computer.

Because portable computers are carried from place to place, they are often subjected to more rigorous conditions than their desktop counterparts. Even so, users want the computer to be lightweight and relatively thin so it is easier to carry. Portable computers with tiltable keyboards usually make certain sacrifices in durability and/or portability to enable the keyboard to tilt. Providing the keyboard in a durable separable housing helps the portable computer withstand the rigors of use, but can increase the weight and thickness of the computer. Conversely, omitting such a housing may achieve a relatively small profile and minimize weight, but the design will tend to be less robust.

SUMMARY OF THE INVENTION

The present invention is directed toward an articulate base for a portable computer, a portable computer having such a base, and a method of configuring a computer. In one embodiment, the base has a front segment and a rear segment connected by a hinge. The front and rear segments are pivotable with respect to one another about the hinge to move the base from a flat configuration to at least one angled configuration. In the angled configuration or configurations, the hinge is elevated and the front and rear segments are both inclined upwardly toward the hinge. The base may include a keyboard which is inclined upwardly toward the hinge when the base is in its angled configuration, thereby presenting the keyboard to a user at an angle. When the base is in its angled configuration(s), it may be adapted to rest on a horizontal support at spaced-apart front and rear support locations. The front support location may be positioned adjacent to the front edge of the base and rear support location may be positioned adjacent to the rear edge of the base.

In another embodiment, the invention provides a portable computer which includes an articulate base, a display and a user input device (e.g., a keyboard). The articulate base may include a lower front edge, a lower rear edge, a front segment having a lower face extending rearwardly from the front edge, and a rear segment having a lower face extending forwardly from the rear edge. The lower faces of the front and rear segments may adjoin one another at a junction. The front and rear segments are movable with respect to one another from a flat storage orientation to at least one use orientation. In the flat storage orientation, the lower front edge, the lower rear edge and the junction may be generally coplanar. In the use orientation(s), the lower front edge and the lower rear edge define a base plane and the junction is elevated above the base plane. The display may be carried by the rear segment. The user input device may be carried by an upper face of the front segment to present the user input device to a user at an angle with respect to the base plane when the junction is elevated above that plane.

Yet another embodiment of the invention provides a portable computer which has an articulate face, a display and a keyboard. The base has a front segment having a lower face and a rear segment having a lower face. The lower faces of the front and rear segments define a lower surface of the base upon which the computer may rest on a horizontal surface, such as a desk. The front and rear segments are movable with respect to one another from a flat configuration to an angled configuration. In the flat configuration of the base, the lower face of the front segment is aligned with the lower face of the rear segment such that the lower surface of the base is flat. In the angled configuration of the base, the lower surface of the base has an apex at a junction of the front and rear segments, the lower face of the front segment inclines downwardly in a forward direction from the apex and the lower face of the rear segment inclines downwardly in a rearward direction from the apex so that that lower surface of the base is angled. The display is pivotably connected to the rear segment. The keyboard is carried by an upper face of the front segment and is presented to a user at an angle when the base is in its angled configuration.

In still another embodiment, the invention provides a method of configuring a portable computer. A lid of the portable computer is pivoted about a first hinge to move the lid from a storage orientation, in which it covers the keyboard, to a use orientation, in which the keyboard is exposed for use. This method may also include the act of resting the computer on a horizontal surface with lower faces of front and rear base segments aligned to define a flat base of the computer which extends along and rests on the horizontal surface. The method may further include pivoting the front and rear base segments with respect to one another about the second hinge to elevate the second hinge above the horizontal surface. This pivoting inclines the lower surfaces of the front and rear base segments downwardly away from the hinge to contact with the horizontal surface.

BRIEF DESCRIPTION OF THE DRAWINGS

FIG. 3 is an isometric isolation view of a portion of the portable computer of FIGS. 1 and 2.

FIG. 4 is a side view of the portable computer shown in FIGS. 1–3 in a flat storage configuration.

FIG. 5 is an isometric view of the portable computer of FIGS. 1–4 in an angled ergonomic use configuration.

DETAILED DESCRIPTION

Figure 1:
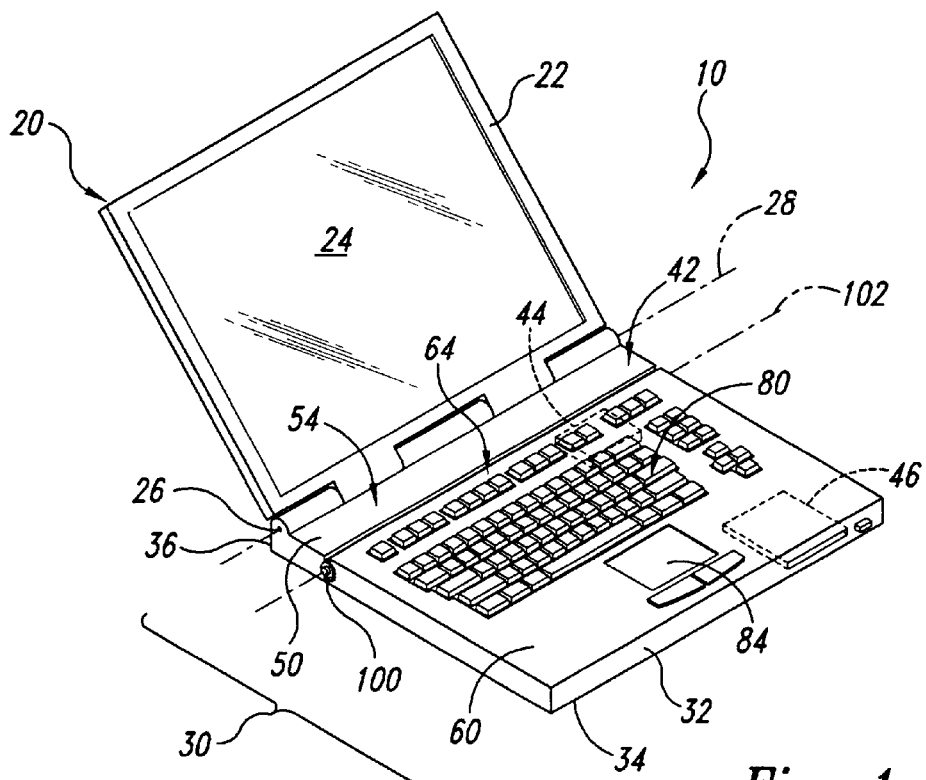
FIG. 1 is an isometric view of a personal computer including an articulating base in accordance with one embodiment of the invention.

Various embodiments of the present invention provide a base for a portable computer, a portable computer or a method of configuring a portable computer. The following description provides specific details of certain embodiments of the invention illustrated in the drawings to provide a thorough understanding of those embodiments. It should be recognized, however, that the present invention can be reflected in additional embodiments and the invention may be practiced without some of the details described in the following description.

Figure 2:
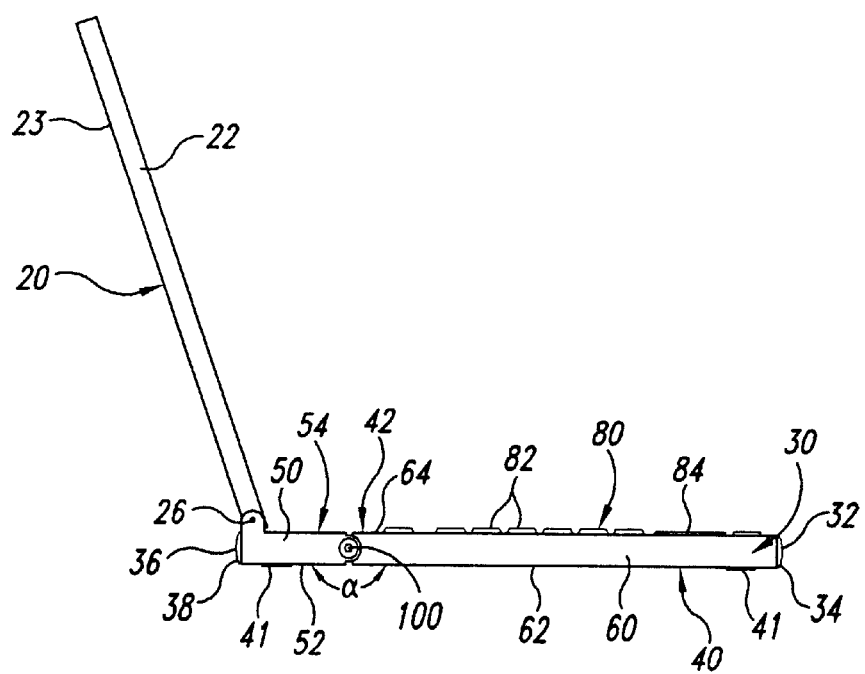
FIG. 2 is a side view of the portable computer of FIG. 1.

FIGS. 1–6 illustrate a portable computer 10 in accordance with one embodiment of the invention. The portable computer 10 generally includes a lid 20 connected to a base 30 by a display hinge 26. The lid includes a lid housing 22 and a display 24 carried by the lid housing. As seen in FIG. 2, for example, the lid 20 also has an upper face 23 which is disposed on the side of the lid opposite the display 24.

The display hinge 26 attaches the lid 20 to the base 30 and defines a pivot axis 28. The lid 20 may pivot about the pivot axis 28 with respect to the base 30 between a generally flat configuration for storage and transport (FIG. 4) and a generally upright configuration wherein the display 24 is facing the user (e.g., FIG. 1) for operating the computer 10.

The embodiment of the base 30 shown in FIGS. 1 and 2 comprises a rear segment 50, a front segment 60 a base hinge 100 joining the front segment 60 to the rear segment 50. The base hinge 100 defines a pivot axis 102 that can be generally parallel to the pivot axis 28 of the display hinge 26.

Figure 6:
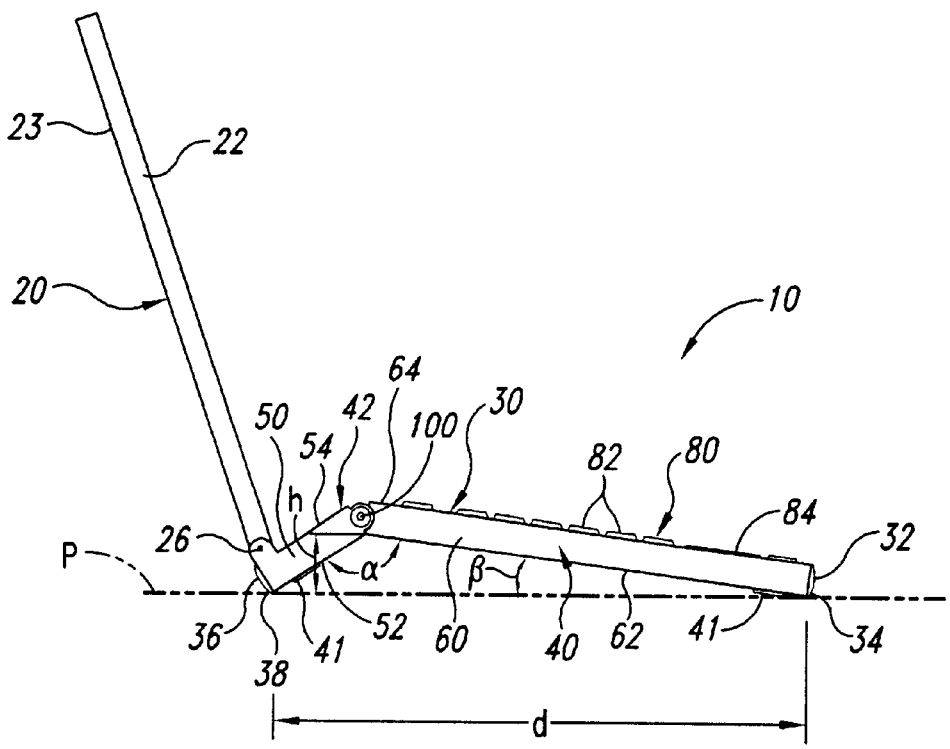
FIG. 6 is a side view of the portable computer of FIGS. 1–5 in the angled configuration of FIG. 5.

The base 30 has spaced-apart front and rear edges 32 and 36, respectively. The front edge 32 has a lower front edge 34, and the rear edge 36 has a lower rear edge 38. The front edge 32 of the base 30 meets the lower surface 40 along the lower front edge 34. If the front edge 32 is relatively flat, the lower front edge 34 would be the corner where these two surfaces join one another. In the illustrated embodiment of FIG. 2 in which the front edge 32 is curved, the lower front edge 34 can be thought of as a somewhat wider, curved surface. This curvature can provide stable support for the base 30 when it is in its angled configuration (FIGS. 5 and 6). In use, the front edge 32 will be positioned closer to and oriented toward the user while the rear edge 36 will be spaced farther away from the user and face in a direction away from the user. As shown in these drawings, both the front edge 32 and rear edge 36 may be curved to present a more blunt surface.

Referring to FIG. 2, the base includes a lower surface 40 and an upper surface 42. The lower surface 40 can be generally coplanar when the base is in its flat configuration (FIG. 4). Although the lower surface 40 is referred to as being "flat," this does not mean that the surface has to be completely featureless. As shown in FIG. 2, for example, the lower surface 40 may include soft, skid-resistant polymeric feet 41 of the type commonly employed in portable computers. The lower surface 40 may also include recesses or other surface features to better enable the portable computer to dock with a port replicator, if so desired. When the base is articulated, as detailed below, this lower surface 40 can take on an angled configuration, shown in FIG. 5.

The rear segment 50 has a front edge 56 and a rear edge defined by the rear edge 36. The rear segment 50 also has a lower face 52 which extends forwardly from the rear edge 36 to a lower shoulder 58 adjacent the front edge 56 of the rear segment 50 (see FIG. 3). An upper face 54 of the rear segment extends forwardly from the rear edge 36 of the base to an upper shoulder 57 of the front edge.

The front segment 60 has a lower face 62, an upper face 64, and a rear edge (66 in FIG. 3). The lower face 62 extends rearwardly from the lower front edge 34 of the base to the lower shoulder (68 in FIG. 3) of the rear edge 66. As best seen in FIG. 3, the upper face 64 of the front segment extends rearwardly from the front edge 32 of the base to an upper shoulder 67 of the rear edge 66. As explained below, the shoulders 57 and 58 of the rear base segment 50 cooperate with the shoulders 67 and 68 of the front base segment 60 to limit movement of the base segments about the base hinge 100.

The portable computer 10 will include a variety of electronic components contained within the housing 22 of the lid 20 or within the base 30. The number and physical arrangement of these components may be varied as desired. Typically, though, the base will house both a processor 44, often carried on a motherboard, and a memory device 46. The memory device 46 may, for example, be a hard disk drive, a removable floppy drive, a removable CD ROM or DVD drive, a flash memory card port, or any other hardware used for storing memory on a temporary or more permanent basis.

The base 30 will also typically include a user input device carried by one or both of the upper faces 54, 64 of the rear and front segments. In the illustrated embodiment, two user input devices are carried on the upper face 64 of the front segment 60. In particular, a pointing device 84 is carried adjacent the front edge 32 of the base 30 and keyboard 80 having a plurality of manually operable keys 82 is spaced rearwardly from the front edge 32. Any suitable arrangement of user input devices could instead be employed. For example, the pointing device 84 may be omitted or positioned within the area of the keyboard, such as with an "eraser-type" joy stick pointing device.

As noted previously, the base 30 includes a hinge 100 which pivotally connects the rear segment 50 to the front segment 60. As best seen in FIG. 3, the front edge 56 of the rear segment may project forwardly and a shaft (not shown in FIG. 3) of the hinge may be received within this forward projection. The rear edge 66 of the front segment includes an elongate recess which is sized and shaped to pivotally receive the projection of the front edge 56 of the rear segment. In this fashion, the hinge 100 can have a single shaft (not shown in FIG. 3, but discussed below in connection with FIGS. 7 and 8) which passes through both the front segment 60 and rear segment 50. Other physical arrangements of the hinge 100 and adjacent edges 56 and 66 of the base segments will be readily apparent to those skilled in this field and it should be recognized that FIG. 3 illustrates only one suitable arrangement.

The front segment 60 and rear segment 50 are pivotable with respect to one another about the hinge 100 to move the base 30 from a flat configuration (e.g., FIGS. 2 and 4) to at least one angled, ergonomic use configuration (e.g., FIG. 6). In the flat configuration, the lower face 52 of the rear segment 50 is generally aligned with the lower face 62 of the front segment 60, providing the base 30 with a flat lower face 40, as noted above. The lower face 52 of the rear segment 50 and the lower face 62 of the front segment 60 meet one another at a junction. When the base 30 is in its flat storage configuration, this junction is coplanar with the lower front edge 34 and the lower rear edge 38 of the base 30.

As shown in FIG. 3, these two lower faces 52 and 62 do not necessarily directly abut one another at all times. Instead, there may be a gap 69 between the lower shoulder 58 of the front edge 56 and the lower shoulder 68 of the rear edge 66. As a consequence, the lower face 62 of the front segment 60 does not physically abut directly against the lower face 52 of the rear segment 50 when the base 30 is in a flat configuration. Nonetheless, the lower face 62 of the front segment 60 and the lower face 52 of the rear segment 50 may be considered as meeting at a junction, with the junction encompassing the gap 69.

In moving the base 30 from the flat configuration to the angled configuration, the front segment 60 is pivoted clockwise about the pivot axis 102 of the hinge 100 and/or the rear segment 50 is pivoted counterclockwise about the pivot axis 102. This bends the base 30 so that the portable computer 10 is moved from the generally L-shaped configuration of FIG. 2 to the modified Z shape of FIG. 6.

When the base 30 is in the angled configuration shown in FIG. 6, the lower front edge 34 and the lower rear edge 38 of the base 30 may be spaced apart from one another along a common plane P. This permits the base 30 to rest on a horizontal surface, with the lower front edge 34 defining a front support location and the lower rear edge 38 defining a rear support location. These two support locations are spaced from one another and the majority of the lower surface 40 of the base 30 is elevated above the plane P on which the computer rests. More particularly, the base 40 may be viewed as having an apex at the junction of the lower faces of the front and rear segments. The lower face 52 of the rear segment is inclined downwardly in a rearward direction from the apex while the lower face 62 of the front segment is inclined downwardly in a forward direction from the apex.

As the front and rear segments pivot with respect to one another about the hinge 100, a cant angle α between the lower face 52 of the rear segment and the lower face 62 of the front segment will vary. In particular, when the base 30 is in its flat configuration, the cant angle α is approximately 180°. At increasing elevations of the hinge 100 above the plane P, the cant angle α will decrease.

When the base 30 is in its angled configuration, the upper face 64 of the front segment 60 will slope downwardly in a direction from the hinge 100 toward the front edge 32 of the base. This will present the user input device(s) carried on that upper face 64 to the user at an angle. As best seen in FIG. 5, this orients the keyboard 80 such that each rearwardly successive rows of keys 82 is at a slightly higher elevation than that of the preceding row of keys. This angled configuration helps improve the orientation of the user's hand and wrist in using the keyboard. As the cant angle α between the lower faces of the front segment 60 and the rear segment 50 decreases, the angle β between the lower face 62 of the front segment and the plane P will increase. In the illustrated embodiments, the upper face 64 of the front segment is generally parallel to the lower face 62 of the front segment. As a consequence, the keyboard 80 carried by the upper face 64 will be oriented at this same angle β with respect to the plane P.

In one embodiment, the base 30 is only supported in a single angled configuration having a fixed cant angle α. This may be accomplished by having a detent and pawl arrangement having only two configurations in which the relative positions of the front and rear segments 60 and 50 are locked. This permits the two segments to pivot about the hinge between the flat configuration and the angled configuration, but does not hold the orientation of the front segment 60 with respect to the rear segment 50 between those two positions. This represents a meaningful improvement over current portable computers in that the user can elect to use the keyboard 80 or other input device in a horizontal orientation (e.g., FIG. 1) or an orientation where the keyboard is presented to him or her at an angle (e.g., FIG. 5).

In an alternative embodiment, the front segment 60 and rear segment 50 can be supported in a variety of different angled configurations, with the cant angle α changing from one orientation to the next. This arrangement permits the user to select a keyboard angle β which particularly suits his or her needs in different work environments. For example, the cant angle a user may select when the portable computer 10 is supported on the horizontal surface of a desk may be different from the cant angle selected when he or she rests the computer on his or her lap for use.

The maximum angle at which the keyboard can be inclined with respect to the plane P can be varied as desired. It is anticipated that this keyboard angle β will range from 0° in the flat configuration of the base 30 to no more than about 15°. Permitting such a wide range of angles of use may not be necessary, though. In one embodiment, the angle β is restricted to a narrower range, with an upper limit of about 8°.

The range of cant angles α necessary to permit such a range of keyboard angles β will depend, at least in part, on the relative lengths of the front segment 60 and rear segment 50 of the base. More specifically, the ratio of the effective length of the rear segment 50 to the effective length of the front segment 60 will affect the cant angle necessary to achieve a given keyboard angle β. The effective length of each of the base segments may be considered the distance between the hinge 100 and the point at which the base segment would contact a horizontal support on which the computer 10 may rest. In the illustrated embodiment, the lower front edge 34 and lower rear edge 38 of the base define the support locations on which the base may rest in its angled configuration. As a consequence, the effective length of the rear segment is the distance between the lower rear edge 38 and the hinge 100 while the effective length of the front segment 60 is the distance between the lower front edge 34 and the hinge 100.

In the illustrated embodiment, the base in its angled configuration is supported by the spaced-apart lower front edge 34 and lower rear edge 38. As the cant angle α decreases, the distance d between these two support locations will decrease. The height h of the junction between the lower surfaces 52 and 62 of the base segments will increase as the cant angle α decreases. If the distance d gets too small or the height h gets too high, the computer 10 may become unwieldy or less stable on the horizontal support.

In one embodiment of the invention, movement of the front base segment 60 and rear base segment 50 with respect to one another is limited to provide an acceptable range of keyboard angles β without unduly compromising the stability of the computer on a horizontal surface. In one such embodiment, the cant angle α is limited to an obtuse angle of no less than 104°. As a practical matter, such a small cant angle may not be necessary. Accordingly, in an alternative embodiment, movement of the front and rear base segments about the hinge 100 is limited to a minimum cant angle of 111° and in another embodiment this cant angle α is limited to no less than 145°.

If so desired, the cant angle α can be limited to a maximum angle, as well. This cant angle should be at least large enough to allow the base to assume a flat configuration for storage and transport. In the illustrated embodiment, this would correspond to a cant angle α of 180° (see FIGS. 2 and 4). By limiting the maximum cant angle to 180° in this embodiment, the user can readily place the base in its flat configuration to facilitate folding of the lid 20 into the storage orientation shown in FIG. 4, wherein it covers the keyboard 80 and is generally flush with the upper face 42 of the base. In one embodiment of the invention, therefore, the cant angle is limited to a range of from 104 to 180°. In another embodiment, the cant angle is restricted to range between 111° and 180° and, in a more specific embodiment, the cant angle is more narrowly limited to a range of 145° to 180°.

As noted above, the height h of the apex of the lower surface 40 of the base 30 may be limited to improve stability and keep the base from becoming too unwieldy. The maximum height h will be depend in part on the relative effective lengths of the front and rear base segments. In one embodiment, though, the height of the apex above the plane P on which the computer may rest is limited to no more than 5.4 centimeters (about 2⅛ inches). This may be higher than is necessary or advisable in other configurations. In accordance with another embodiment, therefore, the maximum height is between 2.7 and 5.4 centimeters (about 1 1/16–2⅛ inches). In still another embodiment, the height is limited to only 5 centimeters (about 2 inches).

The stability of the computer will also depend, at least in part, on the distance d between the front and rear support locations on which the computer may rest, i.e., the distance between the lower front edge 34 and lower rear edge 38 of the embodiment shown in the drawings. In certain embodiments of the invention, the minimum permissible distance d is between 22.9 and 26 centimeters (about 9–10¼ inches), with a minimum distance d of 23.5 centimeters (about 9¼ inches) being employed in one particular embodiment.

The minimum distance d in FIG. 4 may vary for portable computers of different sizes, though. Smaller portable computers will have a base 30 with a depth (i.e., a distance between the front edge 32 and the rear edge 36) less than a larger portable computer. The minimum desired distance d may be smaller for a smaller computer than for a larger computer. Consequently, the minimum distance d between the front and rear support locations of the computer in certain embodiments is 85–97% of the depth of the base in its flat configuration. In one specific embodiment, the minimum distance d of the angled base is 88% of the depth of the flat base.

Relative movement of the front base segment 60 and the rear base segment 50 about the hinge may be limited in any suitable fashion. As best seen in FIG. 3, in one embodiment of the invention, this range of motion is limited by providing two pairs of abutting shoulders. When the base is in the flat configuration, as shown in FIG. 3, the upper shoulder 57 of the rear segment's front edge 56 may abut against the upper shoulder 67 of the front segment's rear edge 66. This will effectively preclude the front segment 60 from pivoting counterclockwise, thereby providing a stop which will let the user know when the base is in the flat configuration.

In FIG. 3, the lower shoulder 58 of the rear segment's front edge 56 is spaced from the lower shoulder 68 of the front segment's rear edge 66, defining a gap 69 between the lower shoulders. The presence of this gap 69 permits the cant angle to be decreased so the base can be bent about the hinge into its angled configuration. The front and rear base segments can continue to pivot about the hinge until the lower shoulders 58 and 68 abut one another. The abutment of the shoulders will effectively preclude further pivotal movement about the hinge. As a result, the width of the gap 69 when the base is in its flat configuration will determine the range of cant angles α through which the base is permitted to move.

The hinge 100 may take any suitable form. For example, the base hinge 100 and the display hinge 26 may both provide only frictional resistance to movement without locking the hinge in any particular orientation. Such hinges are commonly used to attach displays to bases of conventional notebook and laptop computers.

Figure 7:
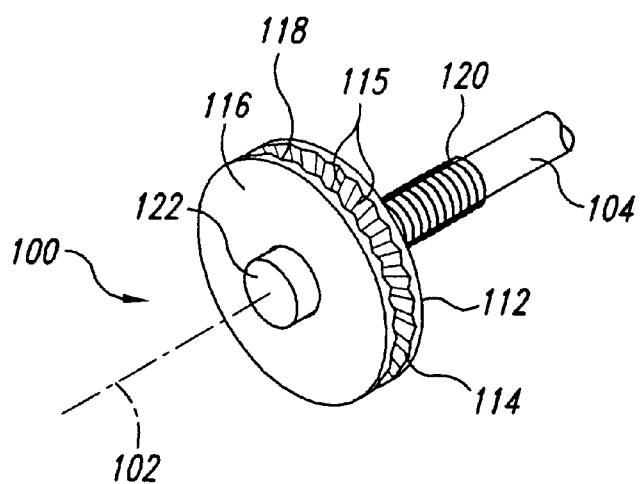
FIG. 7 is an isometric view of a manually operable lock and hinge in accordance with one embodiment of the invention.
Figure 8:
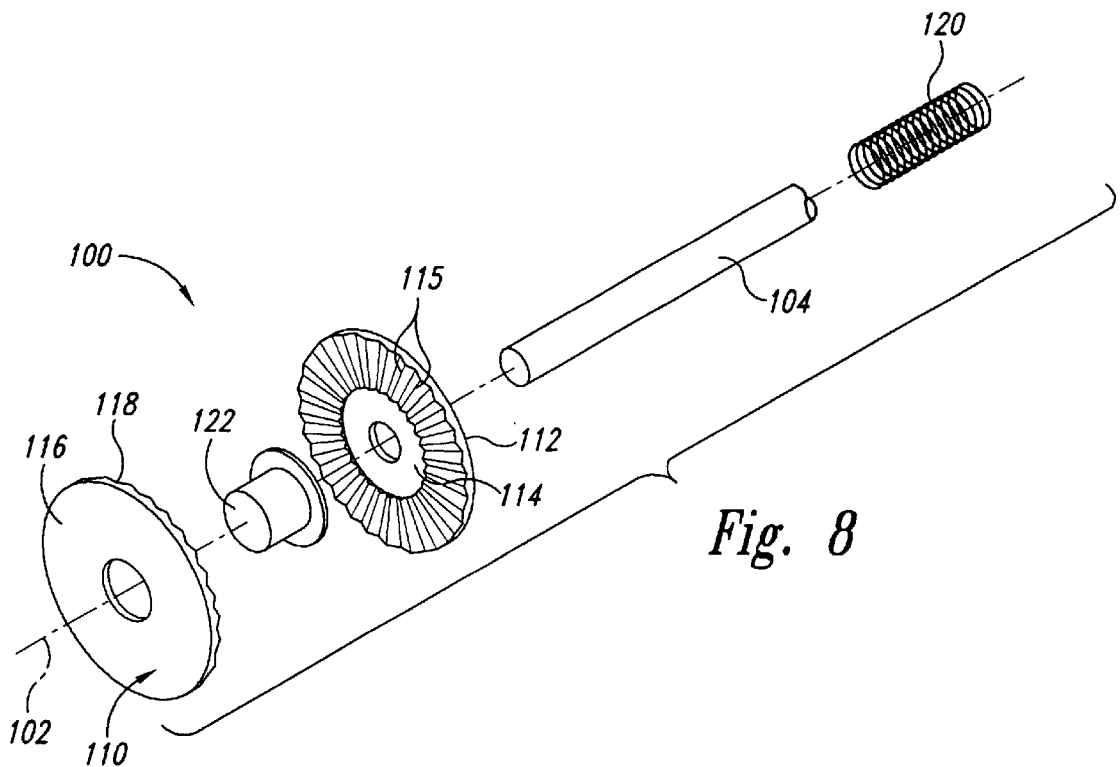
FIG. 8 is an exploded isometric view of the components of the manually operable lock of FIG. 7.

In an alternative embodiment, the display hinge 26 may be a conventional notebook hinge while the base hinge 100 takes the form shown in FIGS. 7 and 8. In this embodiment, the hinge 100 includes a shaft 104 which extends along the pivot axis 102. Although FIGS. 7 and 8 show only a portion of the shaft, this shaft will typically extend across a majority, if not the entirety, of the width of the base 30. The shaft 104 desirably carries at least one manually operable lock 110. A plurality of such locks may be included, spaced at different locations along the length of the shaft 104. For example, one lock 110 may be positioned at each end of the shaft adjacent the side of the base 30. It is anticipated, though, that a single lock 110 positioned on just one side of the base 30 will be sufficient. This has the added benefit of allowing the user to unlock the hinge with just one hand when moving the base into a different configuration.

The manually operable lock 110 of FIGS. 7 and 8 includes an inner locking wheel 112 and an outer locking wheel 116 carried along the shaft 104. One of the locking wheels 112, 116 is adapted to slide along the shaft to permit movement about the hinge. In the illustrated embodiment, the inner locking wheel 112 is adapted to slide axially along the shaft while the outer locking wheel 116 may remain stationary with respect to the shaft. The inner locking wheel 112 includes a locking face 114 which is adapted to mate with a locking face 118 on the opposed surface of the outer locking wheel. These opposed faces 114 and 118 may be provided with mating projections which resist relative rotation of the locking wheels 112 and 116 when the locking wheels are urged toward one another. For example, the locking face 114 of the inner wheel 112 is shown as having a plurality of raised, generally radial spokes 115. These spokes may be adapted to mate with a complementary surface on the face 118 of the outer wheel 116. By providing a plurality of such spokes spaced at different angular orientations, the lock 110 can selectively hold the base in a number of different configurations.

The lock 110 of FIGS. 7 and 8 includes a compression spring 120 carried about the shaft adjacent the inner locking wheel 112. This spring urges outwardly (to the left in FIG. 7) to bias the mating face 114 of the inner locking wheel 112 toward the mating face 118 of the outer locking wheel 116. The bias provided by the spring 120 should be sufficient to hold the front segment 60 and rear segment 50 of the base in place under forces encountered in ordinary use, such as typing on the keyboard 80. Using the spring 120 instead of a rigid locking mechanism, however, permits the inner locking wheel 112 to move out of engagement with the outer locking wheel 116 if too much force is applied. As a consequence, this lock 110 can permit the front and rear segments 60 and 50 of the base 30 to move with respect to one another upon application of a force which exceeds a predetermined level, avoiding damage to the computer 10.

By simply applying sufficient rotational force about the hinge 100 to overcome the bias of the spring 120, the front and rear base segments 60 and 50 can be pivoted. If so desired, this may be the sole mechanism by which the user moves the hinge. In the illustrated embodiment, however, the lock 110 includes an actuator button 122 which is slidably received on the shaft. By pushing the button 122 inwardly (i.e., to the right in FIG. 7) along the shaft, the button 122 can compress the spring 120, thereby relieving the biasing force against the inner wheel 112. The wheels 112 and 116 may then freely move with respect to one another as the user reorients the front and rear base segments to the desired cant angle α.

Figure 9:
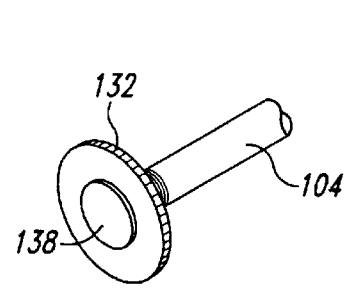
FIG. 9 is a manually operable lock and hinge in accordance with an alternative embodiment of the invention.
Figure 10:
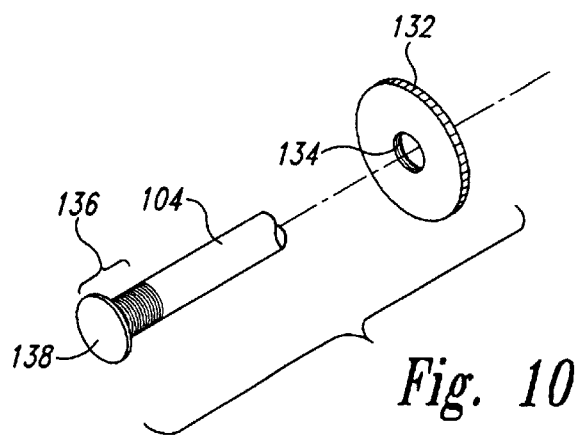
FIG. 10 is an exploded isometric view of the components of the lock and hinge of FIG. 9.

FIGS. 9 and 10 illustrate an alternative lock 130 which can be used on the shaft 104 of the base hinge 100. In this embodiment, the shaft 104 includes a threaded length 136. A thumb wheel 132 with an internally threaded opening 134 is carried by the shaft 104. Rotation of the thumb wheel 132 about the shaft 104 in one direction will move the thumb wheel inwardly along the shaft, urging it against the side of the base. This will effectively hold the front end rear segments in their then-existing angular relationship for use or storage. Rotating the thumb wheel 132 about the shaft 104 in an opposite direction moves the thumb wheel away from the side of the base, thereby permitting the front and rear segments to move with respect to one another about the hinge. A stop 138 may be provided on the end of the shaft to prevent the thumb wheel from coming off the shaft.

As noted above, another aspect of the present invention provides a method of configuring a portable computer. In the following discussion, reference is made to the specific embodiments of the portable computer 10 shown in FIGS. 1–10. It should be understood, however, that this is solely for purposes of discussion; a method of the invention can be carried out with a portable computer having an articulate base which differs from the embodiments shown in FIGS. 1–10.

In accordance with one method of the invention, the portable computer 10 is provided in a compact configuration suitable for storage and transport, such as that shown in FIG. 4. In this configuration, the lid 20 is in a generally horizontally extending storage orientation and covers the keyboard 80. The lid 20 may be pivoted about the display hinge 26 into a use orientation, such as that shown in FIG. 2. In this use orientation, the lid 20 extends upwardly from the base 30, presenting the screen 24 of the base toward the user. This also exposes the keyboard 80 for use.

Either prior to or after lifting the lid 20 into its use orientation, the base 30 may be placed on a support surface, such as the horizontal top of a desk. If the base is in its flat configuration, the lower face 62 of the front segment 60 and the lower face 52 of the rear segment 50 will be aligned to define a coplanar lower surface 40 of the base 30. This flat lower surface 40 can extend along and rest on the support surface.

In accordance with an embodiment of this method, the user may also pivot the front segment 60 with respect to the rear segment 50 about the display hinge 100. This will elevate the display hinge above the horizontal support surface, as suggested in FIG. 6. This pivoting will incline the lower surface 62 of the front base segment downwardly away from the hinge 100 to contact the horizontal surface adjacent the front edge 32 of the base. It will also incline the lower surface 52 of the rear segment 50 downwardly away from the hinge 100 to contact the horizontal surface adjacent the rear edge 36 of the base. As the front and rear segments 60 and 50 pivot about the hinge 100 through decreasing cant angles α, the lower front edge 34 and the lower rear edge 38 of the base will move toward one another.

The user may perform these steps in any desired sequence. In most circumstances, though, it is expected that the user will pivot the lid 20 upwardly into its use orientation before the front and rear base segments 60 and 50 are pivoted with respect to one another about the base hinge 100.

The portable computer may be collapsed from a use configuration (e.g., FIG. 2 or FIG. 6) into its flat transport configuration (FIG. 4) by performing the reverse of the preceding steps. In particular, if the base is in the angled configuration, the front and rear base segments 60 and 50 will be pivoted with respect to one another about the hinge 100 to orient the base 30 in the flat configuration. Either before or after the base is in the flat configuration, the lid 20 may be pivoted about the display hinge 26 into the storage orientation wherein the display 24 is oriented downwardly toward the keyboard.

Although various embodiments of the present invention have been described in detail, it should be recognized that this is solely for purposes of illustration and example. Various changes and modifications to these illustrative embodiments may be made without departing from the spirit and scope of the present invention, which is to be limited only by the following claims.

What is claimed is:

1. A base for a portable computer having a processor housed within the base, an input device carried by the base, and a lid pivotally connected to the base, the base comprising a front segment, a rear segment, a base hinge connecting the front segment and the rear segment, and a lid hinge carried by the rear segment and configured for pivotal connection to a lid having a display, the front and rear segments being pivotable with respect to one another about the base hinge to move the base from a flat configuration in which the front and rear segments are at least generally coplanar to at least one angled configuration in which the base hinge is elevated and the front and rear segments are both inclined upwardly toward the base hinge.

2. The portable computer of claim 1 further comprising a keyboard carried by the front segment of the base.

3. The portable computer of claim 2 wherein the keyboard is inclined upwardly toward the base hinge when the base is in the angled configuration, presenting the keyboard to a user at an angle.

4. The portable computer of claim 1 wherein the base hinge includes a manually operable lock which is moveable between a first position and a second position, the lock being biased toward the first position to resist movement of the front and rear segments with respect to one another, and the lock being manually moveable to the second position to overcome the bias and permit the front and rear segments to pivot with respect to one another about the base hinge.

5. The portable computer of claim 4 wherein the lock is adapted to hold the base in a plurality of angled configurations.

6. The portable computer of claim 4 wherein the bias of the lock is sufficient to hold the front and rear segments in place under forces encountered in ordinary use, but will permit movement of the front and rear segments with respect to one another upon application of a force exceeding a predetermined level.

7. The portable computer of claim 4 wherein the lock comprises opposed surfaces adapted to mate with one another to hold the front and rear segments with respect to one another, the opposed surfaces being biased toward one another.

8. The portable computer of claim 4 wherein the lock includes a release accessible by a user, actuation of the release overcoming the bias to permit the front and rear segments to pivot with respect to one another about the base hinge.

9. The portable computer of claim 1 wherein the base hinge includes a threaded shaft and a thumb wheel carried by the shaft, rotation of the thumb wheel about the shaft in one direction holding the front and rear segments in a fixed angular relationship, rotation of the thumb wheel about the shaft in an opposite direction permitting the front and rear segments to move with respect to one another about the base hinge.

10. The portable computer of claim 1 wherein a lower face of the front segment and a lower face of the rear segment together define a cant angle about the base hinge, the cant angle being limited to range from 104° to 180°, the base being in its flat configuration when the cant angle is 180° and the hinge being elevated when the cant angle is less than 180°.

11. The portable computer of claim 1 wherein a lower face of the front segment and a lower face of the rear segment meet at a junction adjacent the base hinge, movement of the front and rear segments about the base hinge being restricted to limit elevation of the junction above a horizontal surface on which the base may rest to a height of no more than 5.4 cm.

12. The portable computer of claim 1 wherein the base is adapted to rest on a horizontal support at spaced-apart front and rear support locations when the base is in the at least one angled configuration, the front support location being positioned adjacent a front edge of the base and the rear support location being positioned adjacent a rear edge of the base.

13. The portable computer of claim 12 wherein the front support location lies on a lower face of the front segment and the rear support location lies on a lower face of the rear segment, portions of the lower faces of the front and rear segments between the front and rear support locations being elevated above a plane including the front and rear support locations.

14. A portable computer, comprising:
an articulate base including a lower front edge, a lower rear edge, a front segment having a lower face extending rearwardly from the front edge, and a rear segment having a lower face extending forwardly from the rear edge, the lower faces of the front and rear segments meeting one another to define a junction, the front and rear segments being movable with respect to one another from a flat storage orientation, wherein the lower front edge, the lower rear edge and the junction are horizontally aligned, to at least one use orientation wherein the lower front edge and the lower rear edge define a horizontal plane and the junction is elevated above the horizontal plane;
a display carried by the rear segment; and
a user input device carried by an upper face of the front segment, the user input device being presented to a user at an angle with respect to the horizontal plane when the junction is elevated above the horizontal plane.

15. The portable computer of claim 14 wherein the user input device comprises a keyboard.

16. The portable computer of claim 14 wherein movement of the junction is restricted to limit the height of the junction above the horizontal plane to no more than 5.4 cm.

17. The portable computer of claim 14 wherein the angle of the user input device with respect to the horizontal plane is greater at higher elevations of the junction above the horizontal plane.

18. The portable computer of claim 17 wherein movement of the junction is restricted to limit the angle of the user input device with respect to the horizontal plane to no more than 15°.

19. The portable computer of claim 14 wherein the lower faces of the front and rear segments define a cant angle at the junction, the cant angle being limited to range from 104° to 180°, the cant angle being 180° when the lower front edge, the lower rear edge and the junction are horizontally aligned and the junction being elevated when the cant angle is less than 180°.

20. The portable computer of claim 14 wherein the lower faces of the front and rear segments define a flat contact surface on which the computer may rest when the lower front edge, the lower rear edge and the junction are coplanar.

21. The portable computer of claim 14 wherein the lower front edge is adapted to contact a horizontal support at a front support location when the junction is elevated and the lower rear edge is adapted to contact the horizontal support at a rear support location when the junction is elevated, the front and rear support locations being spaced from one another.

22. The portable computer of claim 21 wherein the front and rear segments have a plurality of use orientations, a distance between the front and rear support locations varying from one of the use orientations to another of the use orientations.

23. The portable computer of claim 22 wherein the distance between the front and rear support locations decreases at increasing elevations of the junction above the horizontal plane.

24. The portable computer of claim 22 wherein movement of the front and rear segments with respect to one another is restricted to limit the distance between the support locations to no less than 22.9 cm.

25. The portable computer of claim 14 wherein the front and rear segments are connected to one another by a base hinge adjacent the junction, the front and rear segments moving with respect to one another by pivoting about the base hinge.

26. The portable computer of claim 25 further comprising a display hinge which pivotally connects the display to the rear segment, the base hinge and the display hinge having parallel pivot axes.

27. The portable computer of claim 25 wherein the base hinge includes a manually operable lock which is moveable between a first position and a second position, the lock being biased toward the first position to resist movement of the front and rear segments with respect to one another, and the lock being manually moveable to the second position to overcome the bias and permit the front and rear segments to pivot with respect to one another about the base hinge.

28. The portable computer of claim 14 further comprising a processor and at least one memory device enclosed within the base.

29. A portable computer, comprising:
an articulate base including a front segment having a lower face and a rear segment having a lower face, the lower faces of the front and rear segments defining a lower surface of the base upon which the computer may rest on a horizontal surface the front and rear segments being movable with respect to one another from a coplanar configuration to an angled configuration; in the coplanar configuration, the lower face of the front segment being coplanar with the lower face of the rear segment; in the angled configuration, the lower surface of the base having an apex at a junction of the front and rear segments, the lower lace of the front segment inclining downwardly in a forward direction from the apex and the lower face of the rear segment inclining downwardly in a rearward direction from the apex such that the lower surface of the base is angled;
a display pivotally connected to the rear segment; and
a keyboard carried by an upper face of the front segment, the keyboard being presented to a user at an angle when the base is in the angled configuration;
wherein the front and rear segments are generally coplanar in the coplanar configuration.

30. The portable computer of claim 29 wherein, in the angled configuration, the lower surface of the base defines two horizontally aligned, spaced-apart support locations upon which the computer may rest on a horizontal surface, one of the two support locations being positioned adjacent a forward edge of the front segment and the other of the two support locations being positioned adjacent a rearward edge of the rear segment.

31. The portable computer of claim 30 wherein a majority of the angled bottom surface is elevated above a horizontal plane defined by the two support locations.

32. The portable computer of claim 31 wherein the base has a plurality of angled configurations and movement of the front and rear segments with respect to one another is restricted to limit the distance between the two support locations to no less than 22.9 cm.

33. The portable computer of claim 29 wherein the front and rear segments are connected to one another by a base hinge adjacent the junction, the front and rear segments moving with respect to one another by pivoting about the base hinge.

34. The portable computer of claim 29 wherein movement of the front and rear segments with respect to one another is restricted to limit the height of the junction above the horizontal plane to no more than 5.4 cm.

35. The portable computer of claim 29 wherein the lower faces of the front and rear segments define a cant angle at the junction, the cant angle being 180° when the base is in its flat configuration and the cant angle being limited to range from 104° to 180° top define a plurality of angled configurations.

36. A portable computer, comprising:
an articulate base having a front segment with a front edge, a rear segment with a rear edge, a hinge between the front edge and the rear edge, a lower face which slopes downwardly in a direction from the hinge toward the rear edge and which slopes downwardly in a direction from the hinge toward the front edge, and an upper face having a forward length which slopes downwardly in a direction from the hinge toward the front edge, the front and rear segments being pivotable about the hinge;
a display pivotally connected to the rear segment proximate to the rear edge; and
a keyboard carried on the forward length of the upper surface to present the keyboard to a user at an angle.

37. The portable computer of claim 36 wherein the lower face has an apex adjacent the hinge and the lower face defines a cant angle of less than 180° at the apex.

38. The portable computer of claim 36 wherein the base is pivotable about the hinge into a storage configuration in which the lower face is flat.

39. The portable computer of claim 38 wherein the lower face has an apex adjacent the hinge and the lower face defines a cant angle at the apex, movement of the base about the hinge being restricted to limit the cant angle to range from 104° to 180°.

40. The portable computer of claim 36 wherein the base is adapted to rest on a horizontal support at two spaced-apart support locations, one of the two spaced-apart support locations being positioned adjacent the front edge of the base and the other of the two spaced-apart support locations being positioned adjacent the rear edge of the base.

41. The portable computer of claim 40 wherein the distance between the two support locations varies as the base pivots about the hinge.

42. The portable computer of claim 40 wherein the two spaced-apart support locations are aligned define a horizontal plane, the hinge being spaced above the horizontal plane.

43. A portable computer, comprising:
a front base segment having a front edge, a lower face adapted to supportingly contact a horizontal support, and an upper face;
a rear base segment having a rear edge and a lower face adapted to supportingly contact the horizontal support;
a hinge connecting the front base segment to the rear base segment such that the lower faces of the front and rear base segments can be oriented at a cant angle with respect to one another ranging from 104° to 180°, wherein at cant angles less than 180° the lower face of the front base segment is inclined rearwardly from its front edge upwardly toward the hinge and the lower face of the rear base segment is inclined forwardly from its rear edge upwardly toward the hinge;
a lid pivotally connected to the rear base segment proximate to the rear edge, the lid carrying a display;
a keyboard carried by the upper face of the front base segment, the keyboard being inclined to present the keyboard to a user at an angle when the cant angle is less than 180°.

44. The portable computer of claim 43 wherein movement of the front and rear base segments about the hinge is restricted to limit the cant angle to no less than 111°.

45. The portable computer of claim 43 wherein at a cant angle of 180° the lower faces of the front and rear base segments are aligned with one another to define a flat lower surface of the computer on which the computer can rest on a horizontal surface.

46. The portable computer of claim 43 wherein at cant angles of less than 180°, the lower face of the front base segment is adapted to contact the horizontal support at a forward support location adjacent the front edge, and the lower face of the rear base segment is adapted to contact the horizontal support at a rearward support location adjacent the rear edge, the forward and rearward support locations being horizontally spaced from one another.

47. The portable computer of claim 46 wherein at cant angles of less than 180°, a majority of the lower face of the front base segment and a majority of the lower face of the rear base segment is elevated above the horizontally spaced support locations.

48. The portable computer of claim 43 wherein the keyboard is inclined at an angle with respect to a horizontal plane at cant angles below 180°, the angle of the keyboard with respect to the horizontal plane increasing with decreasing cant angles.

49. The portable computer of claim 43 wherein the hinge is elevated above a horizontal plane at cant angles is less than 180°, the height of the hinge above the horizontal plane increasing with decreasing cant angles.

50. A portable computer comprising:
a lid having an upper face and carrying a display;
a base enclosing a processor and at least one memory device, the base including a front housing and a rear housing, the front housing having an upper face and a lower face, the rear housing having a lower face;
a keyboard carried by the upper face of the front housing;
a first hinge having a first pivot axis and pivotally connecting the lid to the rear housing; and
a second hinge having a second pivot axis and pivotally connecting the rear housing to the front housing, the first and second pivot axes being parallel to one another, the second hinge having a manually operable lock adapted to selectively permit or restrict pivotal movement of the front and rear housings with respect to one another about the second pivot axis;
the first and second hinges permitting the computer to assume a storage configuration and an ergonomic use configuration; in the storage configuration, the lower faces of the front and rear housings cooperating to define a planar lower surface of the base which is parallel to the upper face of the lid and the lid covers the keyboard; and in the ergonomic use configuration, the lower faces of the front and rear housings being oriented about the hinge at an obtuse cant angle with respect to one another to define an angled bottom surface of the computer, the lid extending upwardly to expose the keyboard, the keyboard being presented to a user at an acute angle with respect to a horizontal plane.

51. The portable computer of claim 50 wherein the first and second hinges permit the computer to assume a plurality of use configurations, the cant angle being limited to range from 111° to 180°, the bottom surface of the computer being flat at a cant angle of 180°.

52. The portable computer of claim 50 wherein the base is adapted to rest on a horizontal support at two spaced-apart support locations when the computer is in its ergonomic use configuration, one of the two spaced-apart support locations being positioned adjacent the front edge of the front housing and the other of the two spaced-apart support locations being positioned adjacent the rear edge of the rear housing.

53. The portable computer of claim 52 wherein the first and second hinges permit the computer to assume a plurality of use configurations having different cant angles, the distance between the two spaced-apart support locations decreasing with decreasing cant angles.

54. A method of configuring a portable computer which includes a front base segment having an upper face, a lower face and a front edge; a keyboard carried on the upper surface of the front base segment; a rear base segment having a lower face and a rear edge; a lid carrying a display; a first hinge pivotally connecting the lid to the rear base segment; and a second hinge pivotally connecting the front and rear base segments, the method comprising the acts of:
pivoting the lid about the first hinge to move the lid from a storage orientation, in which the lid covers the keyboard, to a use orientation, in which the keyboard is exposed for use and the display is exposed for viewing; and
pivoting the front and rear base segments with respect to one another about the second hinge to elevate the second hinge above the horizontal surface, such pivoting inclining the lower surface of the front base segment downwardly away from the hinge to contact the horizontal surface adjacent the front edge and inclining the lower surface of the rear base segment downwardly away from the hinge to contact the horizontal surface adjacent the rear edge.

55. The method of claim 54 wherein the lid is pivoted into the use orientation before pivoting the front and rear base segments with respect to one another about the second hinge.

56. The method of claim 54 wherein the second hinge is elevated a distance of no more than 5.4 cm.

57. The method of claim 54 wherein the location at which the horizontal surface contacts the inclined front base segment defines a front support location of the computer and the location at which the horizontal surface contacts the inclined rear base segment defines a rear support location of the computer, the front and rear support locations moving toward one another as the second hinge is elevated above the horizontal surface.

58. The method of claim 57 wherein movement of the front and rear base segments about the second hinge is restricted to limit a distance between the front and rear support locations to no less than 22.9 centimeters.

* * * * *

UNITED STATES PATENT AND TRADEMARK OFFICE
CERTIFICATE OF CORRECTION

PATENT NO.     : 6,612,668 B2  
DATED          : September 2, 2003  
INVENTOR(S)    : Hung Quoc Doan It is certified that error appears in the above-identified patent and that said Letters Patent is hereby corrected as shown below:

Column 13,
Line 29, insert comma between "surface" and "the";
Line 36, "lace" should be -- face --;

Signed and Sealed this

Second Day of December, 2003

JAMES E. ROGAN
*Director of the United States Patent and Trademark Office*